United States Patent
Hayashi et al.

(10) Patent No.: US 6,198,942 B1
(45) Date of Patent: Mar. 6, 2001

(54) TELEPHONE APPARATUS ADAPTABLE TO DIFFERENT COMMUNICATION SYSTEMS

(75) Inventors: Keisaku Hayashi, San Diego, CA (US); Hidehiko Akatsuka, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/273,255

(22) Filed: Mar. 22, 1999

(30) Foreign Application Priority Data

Apr. 21, 1998 (JP) .................................................. 10-110958

(51) Int. Cl.$^7$ ....................................................... H04B 1/38
(52) U.S. Cl. ............................................. 455/552; 455/553
(58) Field of Search .................................... 455/414, 418, 455/426, 432, 550, 552, 553, 556, 564, 565, 567

(56) References Cited

U.S. PATENT DOCUMENTS

| | | | | |
|---|---|---|---|---|
| 3,758,729 | * | 9/1973 | Everhart | 179/99 |
| 4,588,865 | * | 5/1986 | Hestad | 179/99 |
| 5,884,168 | * | 3/1999 | Kolev et al. | 455/432 |
| 6,047,196 | * | 4/2000 | Makela et al. | 455/556 |
| 6,108,562 | * | 8/2000 | Reydbeck et al. | 455/552 |
| 6,125,283 | * | 9/2000 | Kolev et al. | 455/552 |

* cited by examiner

Primary Examiner—Reinhard J. Eisenzopf
Assistant Examiner—Naghmeh Mehrpour
(74) Attorney, Agent, or Firm—Pillsbury Winthrop LLP

(57) ABSTRACT

In a system having a response hold function as a standard function such as CDMA system, a telephone apparatus transmits a response hold request to a control center when an End key is operated upon arrival of an incoming telephone call from another telephone apparatus. Receiving the response hold request, the control center notifies the other telephone apparatus originating the telephone call of a response hold state. In a system with no response hold function provided as a standard function such as TACS system, the telephone apparatus transmits a response hold request to the control center when the End key is operated upon arrival of an incoming telephone call from the other telephone apparatus. Receiving the response hold request, the control center establishes a telephone conversation state between the telephone apparatuses. Then, hold state sound is transmitted by the telephone apparatus to the other telephone apparatus. Thus, the portable telephone apparatus operating under the TACS system is enabled to execute the response hold function of the CDMA system.

6 Claims, 6 Drawing Sheets

FIG. 7

| FUNCTION | CONTENT | ACCESS NUMBER | |
|---|---|---|---|
| | | SYSTEM A | SYSTEM B |
| TRANSFER | SET | △△11 | ◆◆◆4 |
| | START | △△12 | ◆◆◆5 |
| | STOP | △△13 | ◆◆◆6 |
| AUTOMATIC ANSWER | START | △△21 | ◆◆◆1 |
| | REPRODUCE | △△22 | ◆◆◆2 |
| | STOP | △△23 | ◆◆◆0 |

TELEPHONE APPARATUS ADAPTABLE TO DIFFERENT COMMUNICATION SYSTEMS

CROSS REFERENCE TO RELATED APPLICATION

This application relates to and incorporates herein by reference Japanese Patent Application No. 10-110958 filed on Apr. 21, 1998.

BACKGROUND OF THE INVENTION

1. Field of the Invention

The present invention generally relates to cellular telephone and Personal Communication System (PCS) handsets or mobile terminals (hereinafter generically referred to as "Handsets") capable of operating with a plurality of cellular telephone or PCS standards, or with a plurality of wireless service providers. Specifically, the present invention relates to an apparatus and method enabling a user of said handsets or mobile terminals to access and control advanced telephone system features ("Advanced Features") such as response holding, call transferring, or automatic answering, in a manner that is independent of the specific cellular telephone or PCS standard or service provider being used at a given time.

2. Related Art

In recent years, a plurality of wireless communication service providers provide cellular telephone and PCS services. Different service providers may offer wireless communication services based on different frequency bands or different air interface standards. Popular air interface standards include: digital code division multiple access (CDMA), of which cdmaOne is an example; digital time division multiple access (TDMA) of which North American Digital Cellular (NADC), GSM, and Personal Digital Cellular (PDC) are examples; and analog systems such as AMPS, TACS and N-TACS. Moreover, a given service provider may offer service based on different air interface standards in different geographic regions that it serves. This multiplicity of air interface standards has necessitated the development of "multimode" handsets for users that are geographically mobile. Additionally, even for a given air interface standard, control of Advanced Features may vary from service provider to service provider or even from geographic region to geographic region for a given service provider.

Such differences in Advanced Feature Control include command and response formats and sequences. For example, a response hold function is used when the user cannot answer a call immediately when a telephone call is received. In a cdmaOne or a PDC system, when the user operates an End key which is also known as an end conversation key, a signal requesting a response hold state is transmitted to a service proivder's control center. Upon receiving the signal requesting the response hold state, the control center transmits a response to the calling party, "Wait for a moment please". The message tells the user of the telephone apparatus originating the telephone call that the communication is put in a response hold state. If necessary, the user waits for a while till the end of the state. As the user executing the response hold key operates a Start key during the response hold state, the response hold state is terminated, allowing a telephone conversation with the user making the call to be started. The End key can also be operated in a response hold state to cut-off the communication without a conversation.

In the case of the CDMA and PDC systems, such a response hold function is provided as a standard function. In the case of a TACS system, however, the response hold function is not available. Thus, if the End key is pressed when a telephone call arrives in the CDMA system, the response hold function is activated. If the End key is pressed when a telephone call arrives in the TACS system, on the other hand, processing to end a telephone conversation is carried out. That is, if the user of the telephone set is not capable of distinguishing a system allowing the use of the response hold function from a system disallowing the function, the user may as a result cut-off the communication when the user actually intends to put the communication in a response hold state by operating the End key. Similarly, when a handset is currently in use with a CDMA system, a user may press the End key, thinking that he is in a TACS system and he is ending the call, but instead he invokes a response hold function. To avoid these problems, the response hold function may be disabled in a dual mode phone. However this solution results in the complete loss of use of the response hold function, even in systems that offer it.

There is another problem related to a telephone number used for requesting the control center in the network to set, enable and disable a function. This problem is attributed to the fact that the telephone number varies from system to system even for the same function. For example, consider a telephone call transferring function which is executed mainly by the control center for transferring a telephone call to specified telephone number or a function for recording a message in the control center. The user who wants to use the telephone call transferring function first of all dials an access telephone number to make a telephone call to the control center. In many cases, access telephone numbers for setting a telephone call transfer, enabling the telephone call transfer and disabling the telephone call transfer are different from each other.

In addition, the access telephone numbers for the CDMA system are different from those for the TACS system, the access telephone numbers also vary from service provider to another service provider and the access telephone numbers are also different depending on whether the telephone system is analog or digital. Traditionally, the user specifies an access number described in a manual by operating, among other buttons, numeric keys in order to make a telephone call to the control center. Thus, even if a portable telephone apparatus is capable of coping with a plurality of systems, the user himself must verify an access telephone number which is provided for each individual function, each individual system, and each individual service provider and then dial the verified access telephone number to make a telephone call to the control center. An unattended automatic answering function used by the control center for recording a message transmitted by a telephone apparatus originating a telephone call is similarly implemented.

However, only invocation and termination of such functions are of interest to users. If a user has to dial an access telephone number for a system which is entirely different from other numbers for other systems, accessing the functions is very inconvenient.

SUMMARY OF THE INVENTION

It is thus an object of the present invention to provide a telephone apparatus that is capable of coping with a plurality of systems and service providers, with common user operations to access Advanced Features, regardless of system or service provider.

According to the present invention, in response to a command entered by a user, a telephone apparatus carries out predetermined processing which is individually tailored to one of a plurality of systems or service providers and varies in dependence on at least one of the following: control signal transmission system, a frequency in use, the telephone service provider being used and the type of service. The predetermined command is provided for one of the same plurality of systems which serves as a Standard System. When the predetermined command is entered to the telephone apparatus used for a system or service provider other than the Standard System, the telephone apparatus carries out predetermined processing to execute the command as intended by the user. For example, if a PDC system with a given service provider is used as a Standard System, non-standard systems for the response hold function include the CDMA and TACS systems.

BRIEF DESCRIPTION OF THE DRAWINGS

Other objects, features and advantages of the present invention will become more apparent from the following detailed description made with reference to the accompanying drawings. In the drawings:

FIG. 7 is a table showing relations between access numbers and functions for the systems A and B.

DETAILED DESCRIPTION OF THE PREFERRED EMBODIMENT

Figure 1:
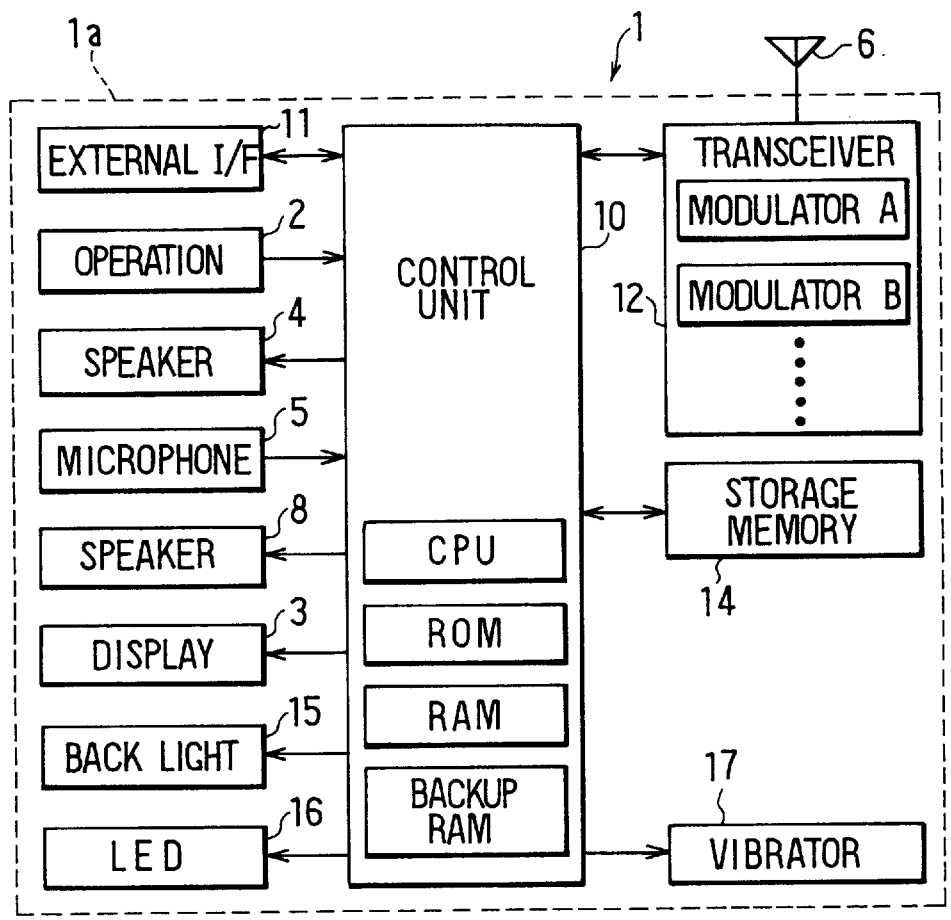
FIG. 1 is a block diagram showing the internal electronic circuit of a portable telephone apparatus according to an embodiment of the present invention.
Figure 2:
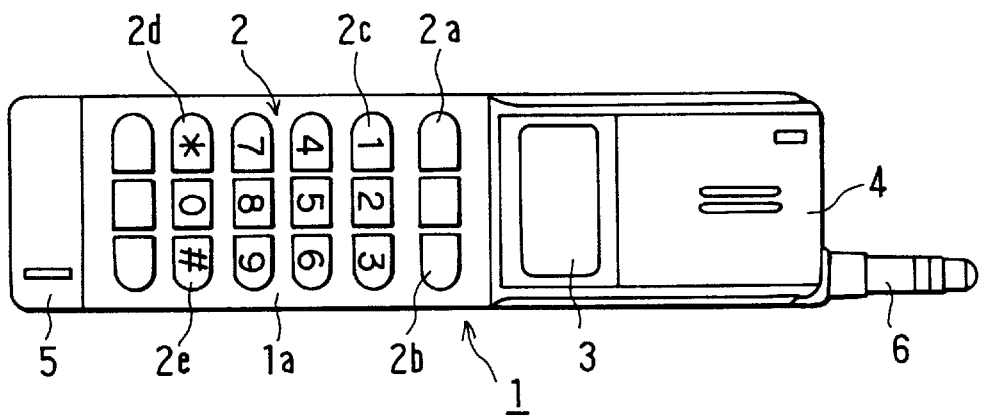
FIG. 2 is a front view showing the portable telephone apparatus.

As shown in FIGS. 1 and 2, a portable telephone apparatus 1 has a shape and size to be held by one hand and is put in an oblong case 1a for portability and convenience. As an operation unit 2, a variety of functional keys such as a Start key 2a, an End key 2b, numeric keys 2c for entering a dial number of a telephone call destination, a '*' key 2d and a '#' key 2e are positioned near the center of the front face of the case 1a. A microphone 5 to be used by the user for entering voice during a telephone conversation is provided below the operation unit 2. Above the operation unit 2, on the other hand, a liquid crystal display (LCD) device serving as a display 3 is provided for displaying information such as a message transmitted from another telephone apparatus, an operation guide for the portable telephone apparatus 1 and operation status. Above the display 3, a speaker 4 is provided for outputting an audio signal. At the upper edge of the case 1a above the speaker 4, a rod antenna 6 which can be pushed into and pulled out from the case 1a is provided. The antenna 6 allows radio communication to be established between the portable telephone apparatus 1 and a plurality of base stations of the service provider.

As shown in FIG. 1, in addition to the speaker 4, the portable telephone apparatus 1 has an embedded ringer 8 which is used for generating incoming telephone call sound when an incoming telephone call signal arrives from the service provider, or may provide additional audio prompts for the user. Internal components of the portable telephone apparatus 1 include an external interface (I/F) unit 11, a transceiver unit 12, an storage memory 14, a back light 15 of the display 3, an incoming telephone call LED 16, a vibrator 17 and a control unit 10 connected to the other components. The external I/F unit 11 can be connected to equipment such as a personal computer or a facsimile apparatus for exchanging data with the portable telephone apparatus. The transceiver unit 12 is used for radio communication with a base station through the rod antenna 6. Implemented by a nonvolatile memory such as an EEPROM or flash memory, the information storage memory 14 is used for storing data such as user phone book, user schedule items, or other data that may be altered during the operation of the telephone apparatus, but should be retained in the event of power interruption to the telephone apparatus. The incoming telephone call LED 16 is turned on when a telephone call arrives. The control unit 10 carries out various kinds of control processing. It should be noted that if vibration is generated at the vibrator 17, the case 1a of the portable telephone apparatus 1 itself also vibrates due to the vibration of the vibrator 17.

The control unit 10 is implemented by a microcomputer comprising components such as a central processing unit (CPU), read only memory (ROM), random access memory (RAM), a datapaths and busses for communication among components, and an I/O unit. The control unit 10 carries out various kinds of control processing in order to implement functions of an ordinary portable telephone apparatus. The control processing includes: monitoring broadcast paging signals from a plurality of base stations through the transceiver unit 12; transmitting and receiving control signals from a plurality of base stations via the transceiver unit 12 for the purpose of initiating and terminating voice or data phone calls and Advanced Features; coding ingoing and outgoing data streams representing voice or data phone messages; or generating audio (via ringer 8) or video (via display 3) prompts or messages to the user of the portable telephone apparatus. For example, the incoming telephone call processing may include steps of generating an audio prompt through the ring 8 or alternatively generating vibration at the vibrator 17, displaying information such as a description of the incoming telephone call on the display 3 and changing a display color of the back light 15 and the incoming telephone call LED 16. The sound input/output processing is carried out when the telephone call transmission processing connects a telephone apparatus called by a transmitted call signal to the telephone line network, enabling a telephone conversation between the calling potable telephone apparatus 1 and the called telephone apparatus and when the connection processing connects the portable telephone apparatus 1 to the telephone line network, enabling a telephone conversation between the calling telephone apparatus 1 and the called telephone apparatus.

It should be noted that the potable telephone apparatus 1 is designed so as to be capable of carrying out predetermined processing tailored individually to any one of a plurality of systems. The plurality of systems are different from each other due to differences among control signal transmission systems such as the CDMA (cdmaOne), TACS and AMPS systems, differences among frequencies in use such as 800 MHz and 1.5 GHz, differences among telephone service providers and differences among the types of communication services such as voice communication, facsimile communication and data communication. Since the differences among the control signal transmission systems and the differences among the frequencies in use cannot be coped with by only the control unit 10, the transceiver unit 12 is typically designed to include a plurality of modulators such as modulators A, B and so on in order to cope with the differences. The controller 10 is then designed to be capable of determining which modulator has modulated a signal.

In a portable telephone apparatus adopting the CDMA or PDC system, for example, the response hold function can be used. When an incoming telephone call is received from an external source, the response hold function is in general executed by operating the End key 2b. In the case of a portable telephone apparatus adopting the TACS system, on the other hand, the response hold function itself is not provided. Thus, when the End key 2b is operated, the communication is generally cut-off without a conversation. In order to solve this problem, the portable telephone apparatus 1 carries out processing to implement a function which substantially serves as a substitute for the response hold function when the End key 2b is operated even if the TACS system is adopted.

Figure 3:
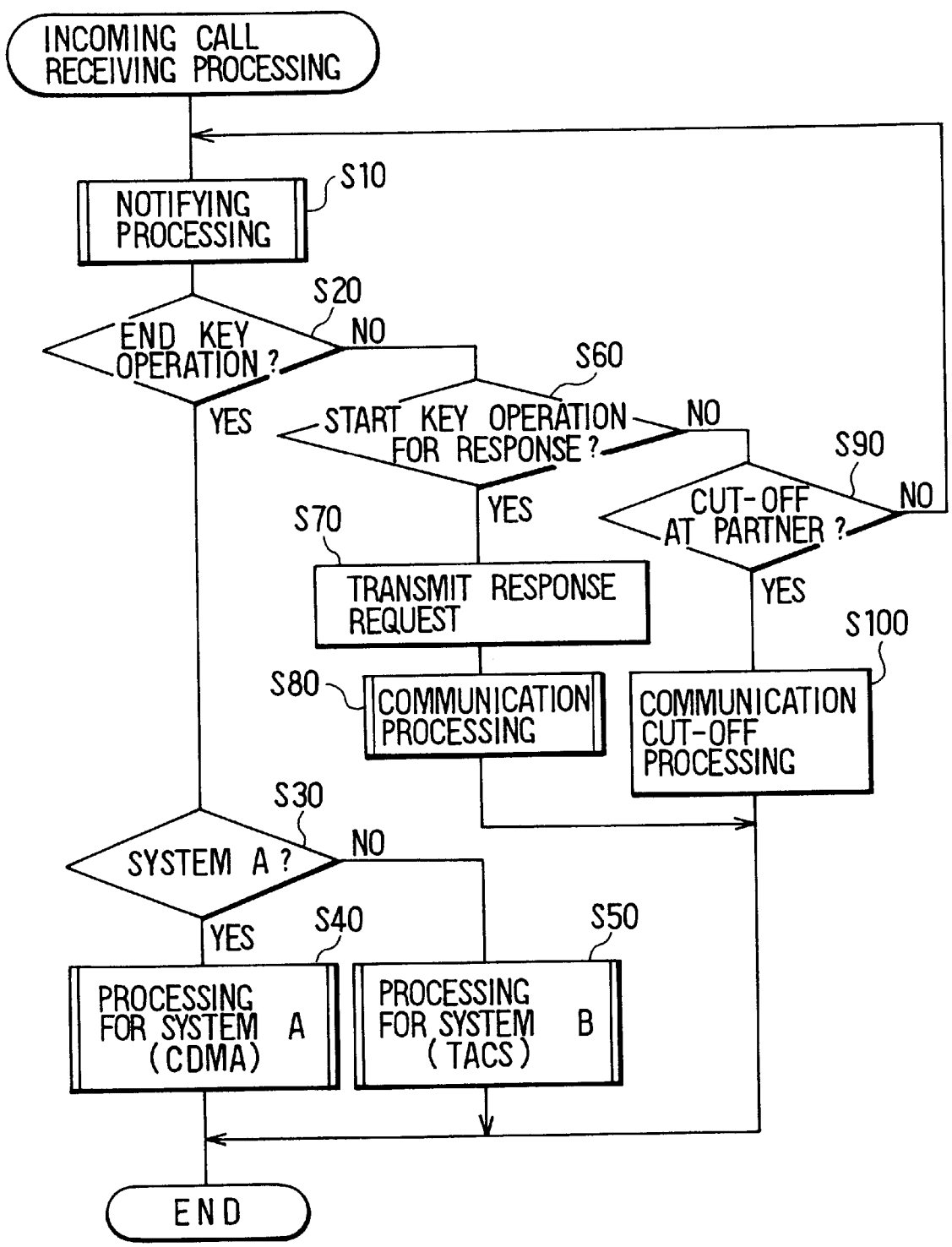
FIG. 3 is a flow diagram of processing carried out by the portable telephone apparatus to handle an incoming telephone call.
Figure 4:
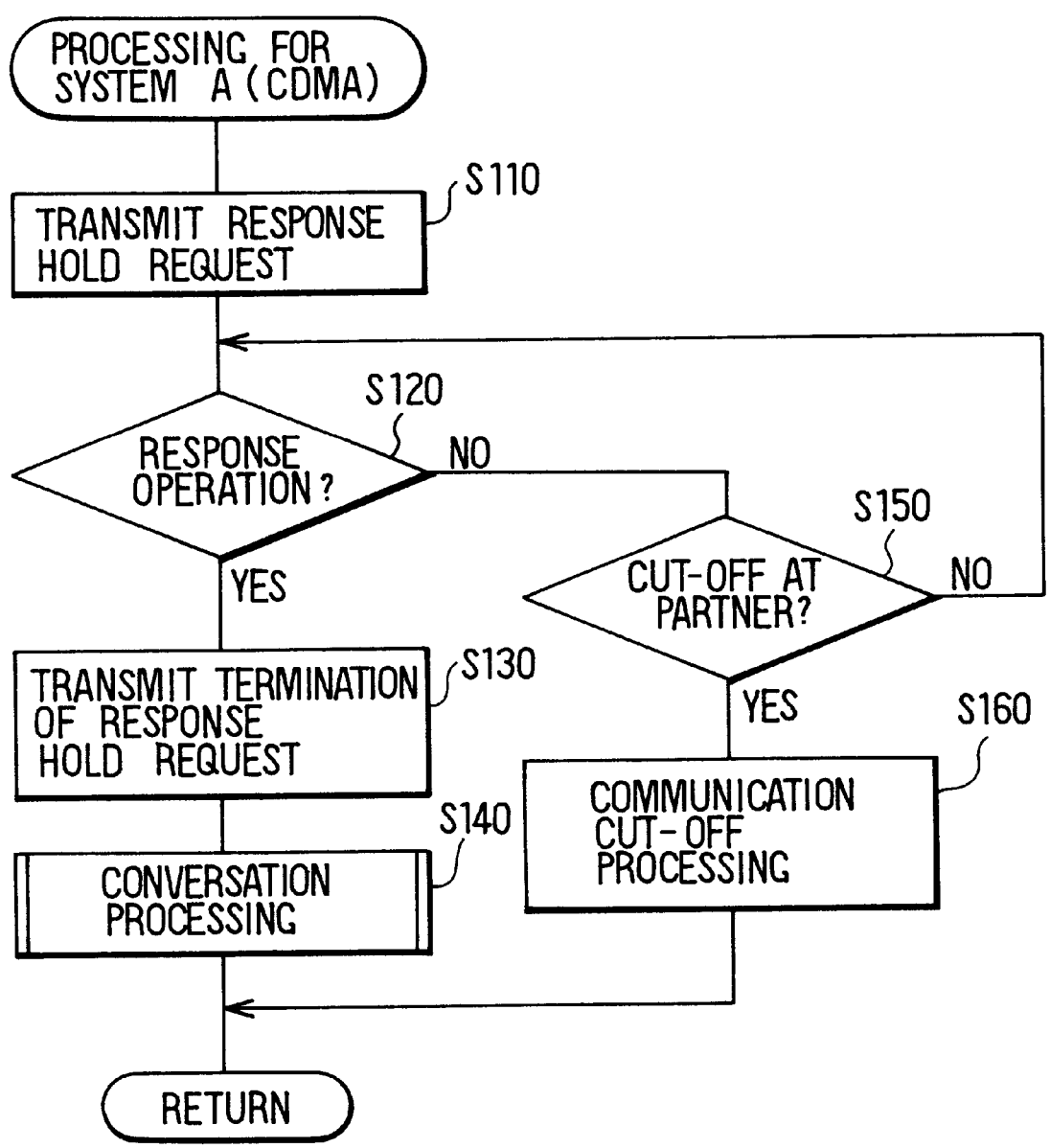
FIG. 4 is a flow diagram of a part of the processing shown in FIG. 3 to be carried out for system A.
Figure 5:
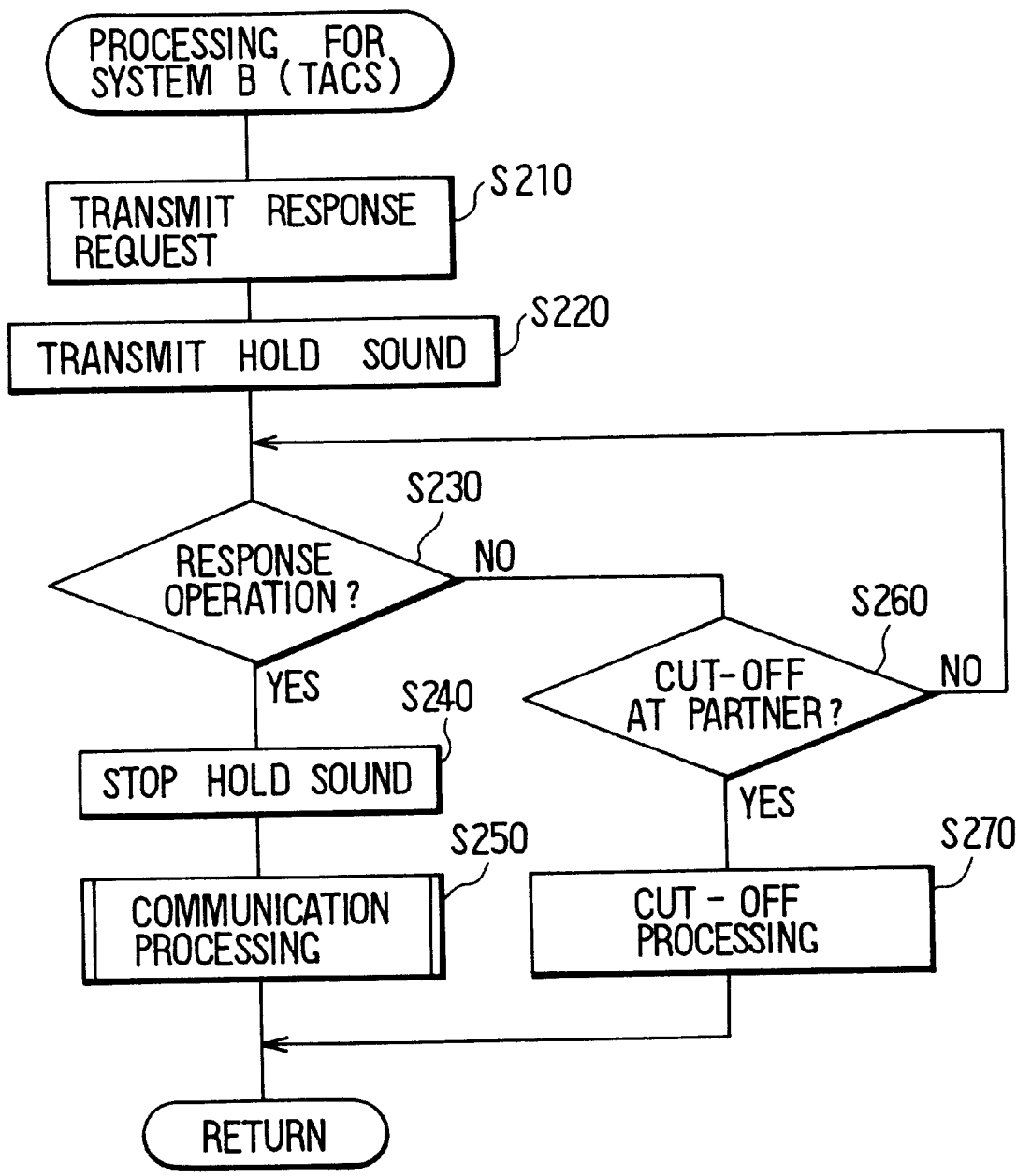
FIG. 5 is a flow diagram of a part of the processing shown in FIG. 3 to be carried out for system B.

In order to implement this function, processing to receive an incoming telephone call stored in the ROM employed in the control unit 10 is explained by referring to flow diagrams shown in FIGS. 3 to 5. It should be noted that this incoming telephone call receiving processing is started when a telephone call is received.

As shown in FIG. 3, the processing begins with step S10 at which notifying processing is carried out when an incoming telephone call is received. The notifying processing includes one or more of the following: an operation to display information on the display 3; an operation to turn on the incoming telephone call LED 16 and the back light 15; an operation to generate vibration in the vibrator 17; and an operation to generate incoming telephone call sound through the ringer 8. The transceiver unit 12 is capable of providing the control unit (10) with information regarding which demodulator in transceiver (12) receives a signal and which of type of service, for example voice, facsimile or data, relates to an incoming call.

By execution of such notifying processing at step S10, the user becomes aware of the fact that an incoming telephone call exists and carries out an operation accordingly.

The processing then goes on to step S20 to determine whether a predetermined entry of key strokes has been carried out by the user. If the End key 2b has been operated, that is, if the result of the determination at step S20 is YES, the processing proceeds to step S30 to determine whether the incoming telephone call mode is system A. If the incoming telephone call mode is system A, that is, if the result of the determination at step S30 is YES, the processing proceeds to step S40 at which processing for system A is carried out. If the incoming telephone call mode is system B, that is, if the result of the determination at step S30 is NO, on the other hand, the processing proceeds to step S50 at which processing for system B is carried out. System A is a system for which the response hold function is provided as a standard function. On the other hand, system B is a system for which the response hold function is not provided as a standard function. The CDMA and PDC systems are classified as system A while the TACS system is classified as system B.

If no predetermined key operation has been operated, that is, if the End key 2b has not been operated or if the result of the determination at step S20 is NO, on the other hand, the processing proceeds to step S60 to determine whether a response operation has been carried out. It should be noted that the response operation can be carried out by pressing the Start key 2a or another key that has a function of the response operation equivalent to the Start key 2a. The portable telephone apparatus 1 determines whether there has been an operation to press a key which functions to respond to an incoming telephone call.

If a response operation has been carried out, that is, if the result of the determination at step S60 is YES, the processing proceeds to step S70 at which a response request is transmitted to a control center in the telephone line network for carrying out predetermined communication processing. The processing then continues to step S80 at which the control center establishes a communication state between the portable telephone system 1 and a telephone apparatus transmitting the telephone call and carries out processing of a telephone conversation.

If no response operation has been carried out, that is, if the result of the determination at step S60 is NO, on the other hand, the processing proceeds to step S90 to determine whether the communication partner has cut off the communication. If the communication partner has not cut off the communication, that is, if the result of the determination at step S90 is NO, the processing goes back to step S10. If the communication partner has cut off the communication, that is, if the result of the determination at step S90 is YES, on the other hand, the processing goes on to step S100 at which predetermined cut-off processing is carried out before ending the processing of an incoming telephone call.

Next, the processing carried out at step S40 of the flow diagram shown in FIG. 3 for system A is explained by referring to the flow diagram shown in FIG. 4.

Since system A such as the CDMA system is a system for which the response hold function is provided as a standard function, the processing is carried out in the same way as the conventional portable telephone apparatus. As shown in FIG. 4, the flow diagram begins with step S110 at which a response hold request is transmitted to the control center. Receiving the response hold request, the control center does not establish a telephone conversation state between the portable telephone apparatus 1 and the telephone apparatus originating the telephone call. Instead, the control center notifies the telephone apparatus originating the telephone call of a response hold state. Typically, the control center transmits a guidance message, "Please wait for a moment", to the telephone apparatus originating the telephone call and then providing music prepared in advance. The user of the telephone apparatus originating the telephone call is thereby aware of the response hold state and waits till the response hold state is ended if necessary.

Then, after transmitting the response hold request to the control center at step S110, the processing goes on to step S120 to determine whether a response operation has been carried out by the user of this portable telephone apparatus 1. If a response operation has been carried out, that is, if the result of the determination at step S120 is YES, the processing proceeds to step S130 at which a request to terminate the response hold state is transmitted to the control center. Receiving the request to terminate the response hold state, the control center stops the operation to output the guidance message and the music to the telephone apparatus originating the telephone call, establishing a telephone conversation state between the portable telephone apparatus 1 and the telephone apparatus originating the telephone call. The processing then continues to step S140 at which telephone conversation processing is carried out. As the telephone conversation processing is finished, this processing for system A is ended and the control is returned to the flow diagram shown in FIG. 3.

If no response operation has been carried out, that is, if the result of the determination at step S120 is NO, on the other hand, the processing proceeds to step S150 to determine whether the communication partner has cut off the communication. If the communication partner has not cut off the communication, that is, if the result of the determination at step S150 is NO, the processing goes back to step S120. If the communication partner has cut off the communication, that is, if the result of the determination at step S150 is YES, on the other hand, the processing goes on to step S160 at which predetermined cut-off processing is carried out before ending this processing for system A.

Next, the processing carried out at step S50 of the flow diagram shown in FIG. 3 for system B is explained by referring to the flow diagram shown in FIG. 5.

Since system B such as the TACS system is a system for which the response hold function is not provided as a standard function, a response hold request cannot be transmitted to the control center. In this case, processing to execute a function serving as a substitute for the response hold function is thus carried out.

As shown in FIG. 5, the flow diagram begins with step S210 at which a response request is transmitted to the control center. Receiving the response request, the control center establishes a telephone conversation state between the portable telephone apparatus 1 and the telephone apparatus originating the telephone call. Then, the processing goes on to step S220 at which hold state sound is transmitted by the portable telephone apparatus 1 to the telephone apparatus originating the telephone call. As an alternative, or in addition, to the hold state sound, a guidance voice expressed in words that the communication is put in a hold state can also be transmitted as well. In spite of the fact that a telephone conversation state has been established between the portable telephone apparatus 1 and the telephone apparatus originating the telephone call, hearing the guidance voice, the user of the telephone apparatus originating the telephone call knows that the communication is put in a hold state and waits for the guidance sound to be stopped if necessary. That is, the processing for system B is different from the processing for system A in that, in the case of the former, a telephone conversation state is established right away between the portable telephone apparatus 1 and the telephone apparatus originating the telephone call upon the arrival of the telephone call, and the portable telephone apparatus 1 itself transmits the hold state sound at the beginning of the telephone conversation state established between the portable telephone apparatus 1 and the telephone apparatus originating the telephone call. In essence, however, the processing for system B is carried out to accomplish a function serving as a substitute for the response hold function of system A described above.

After steps S210 and S220 at which the communication is put in a state substantially equivalent to the response hold state, the processing continues to step S230 to determine whether a response operation has been carried out by the user of this portable telephone apparatus 1. If a response operation has been carried out, that is, if the result of the determination at step S230 is YES, the processing proceeds to step S240 at which the operation to transmit the hold state sound is stopped. After the operation to output the hold state sound to the telephone apparatus originating the telephone call is stopped, the processing continues to step S250 at which telephone conversation processing is carried out since a telephone conversation state has been established between the portable telephone apparatus 1 and the telephone apparatus originating the telephone call. As the telephone conversation processing is finished, this processing for system B is ended and the control is returned to the flow diagram shown in FIG. 3.

If no response operation has been carried out, that is, if the result of the determination at step S230 is NO, on the other hand, the processing proceeds to step S260 to determine whether the communication partner has cut off the communication. If the communication partner has not cut off the communication, that is, if the result of the determination at step S260 is NO, the processing goes back to step S230. If the communication partner has cut off the communication, that is, if the result of the determination at step S260 is YES, on the other hand, the processing goes on to step S270 at which predetermined cut-off processing is carried out before ending this processing for system B.

By carrying out the processing of an incoming telephone call described above, it is possible to notify the user of a telephone apparatus originating a telephone call of a response hold state in the event of the incoming telephone call not only for a system such as the CDMA system for which the response hold function is provided as a standard function, but also for a system such as the TACS system with the response hold function not provided as a standard function. In the case of a system such as the TACS system with the response hold function not provided as a standard function, a function serving as a substitute for the response hold function of the CDMA system can thus be executed. As a result, what needs to be done by the user of the portable telephone apparatus 1 receiving an incoming telephone call is merely to operate the End key 2b in order to put the communication in a hold state without thinking about differences among the systems. By making the operation to put the communication in a hold state common to all the systems, the operation can be carried out more conveniently.

The functions explained by referring to the flow diagrams shown in FIGS. 3 to 5 as described above are a response hold function executed for an incoming telephone call and a function serving as a substitute for the response hold function. There are also the following differences in other functions among the systems. Examples of the other functions provided for rendering a variety of services are an incoming telephone call transfer function for transferring an incoming telephone call from the portable telephone apparatus 1 to a telephone number stored in advance, and an unattended automatic answering function which is used for recording a message transmitted by a telephone apparatus originating a telephone call for the portable telephone apparatus 1 in the control center in case the user of the portable telephone apparatus 1 is not available. In order to make use of these services, it is necessary for the user of the portable telephone apparatus 1 to transmit a predetermined command to the control center.

Specifically, when it is desired to set the incoming telephone call transfer function for system A for example, an access number of 'ΔΔ11' is transmitted as shown in FIG. 7, a table of access numbers associated with the incoming telephone call transfer function and the unattended automatic answering function provided for systems A and B. When it is desired to enable or disable the incoming telephone call transfer function for system A, an access number of 'ΔΔ12' or 'ΔΔ13' is transmitted respectively. When it is desired to set, enable or disable the unattended automatic answering function for system A, an access number of '△△21', '△△22' or '△△23' is transmitted respectively. As for system B, access numbers entirely different from those for system A are provided. That is, when it is desired to set, enable or disable the incoming telephone call transfer function for system A, an access number of '♦♦♦4', '♦♦♦5' or '♦♦♦6' is transmitted respectively. When it is desired to set, enable or disable the unattended automatic answering function for system B, an access number of '♦♦♦1', '♦♦♦2' or '♦♦♦0' is transmitted respectively. As described above, it is necessary to use access numbers of a numbering system entirely different from system to system.

In order to enhance the operation convenience of the portable telephone apparatus 1 for the user to enjoy, the user is provided with a capability of setting, enabling and disabling desired functions by carrying out operations common to systems without being conscious of differences among the systems. Operations to set these functions are explained by referring to a flow diagram shown in FIG. 6. The flow diagram represents function setting processing which is carried out by the control unit 10 when the user sets a function of the portable telephone apparatus 1.

The function setting processing is started when the operation unit 2 is operated by the user to change the operating mode of the portable telephone apparatus 1 to a function setting mode from a normal mode in which no specific processing is being carried out by the portable telephone apparatus 1.

The processing begins with step S310 to wait for a function number with a predetermined number of digits to be entered by the user. When the user enters a number of a mode for setting the function to transfer an incoming telephone call or the unattended automatic answering function by operating the numeric keys 2c of the operation unit 2, that is, YES in S310, the processing goes on to step S320 to determine whether or not the number is a function number.

Since the number is a function number in this case, the result of the determination at step S320 is YES, causing the processing to proceed to step S330 at which a setting screen is displayed on the display 3. It should be noted that, in this embodiment, by entering a predetermined function number by operation of keys, 6 function setting/enabling/disabling screens are displayed cyclically one after another in the following order: incoming telephone call transfer setting→incoming telephone call transfer enabling→incoming telephone call transfer disabling→unattended automatic answering setting→unattended automatic answering enabling→unattended automatic answering disabling and back to the incoming telephone call transfer setting and so on.

Then, the processing proceeds to step S340 to determine whether the Start key 2a is operated. If the Start key 2a is operated, that is, if the result of the determination at step S340 is YES, the processing continues to step S350 at which the type of the function setting/enabling/disabling screen is put in a blinking display state to let the user know which operation of the screen selected by the user is going to be carried out to set, enable or disable a function. The user confirms the setting which has already selected by the user.

In the mean time, the processing proceeds to step S360 to determine which system, that is, which of systems A and B, is adopted. If the result of the determination indicates system A, the processing goes on to step S370 at which an access number for system A is read out. The processing then goes on to step S380 at which the access number read out at step S370 is transmitted to the control center. If the displayed screen is a screen for enabling the function to transfer an incoming telephone call, for example, the access number '△△12' of system A shown in the table of FIG. 7 for enabling the function to transfer an incoming telephone call is transmitted to the control center.

If the result of the determination at step S360 indicates system B, on the other hand, the processing goes on to step S390 at which an access number for system B is read out. The processing then goes on to step S400 at which the access number read out at step S390 is transmitted to the control center. If the displayed screen is a screen for enabling the function to transfer an incoming telephone call, for example, the access number '♦♦♦5' of system B shown in the table of FIG. 7 for enabling the function to transfer an incoming telephone call is transmitted to the control center.

After the access number is transmitted to the control center at step S380 or S400, the portable telephone apparatus 1 goes back to the normal mode. If the user desires a screen other than the previously displayed screens to set, enable and disable the function to transfer an incoming telephone call or the unattended automatic answering function, the result of the determination at step S320 is NO which causes the processing to continue to step S410. At step S410, processing for another function is carried out. Since the other function is not a characteristic of the present invention, however, detailed explanation of the processing is omitted.

Figure 6:
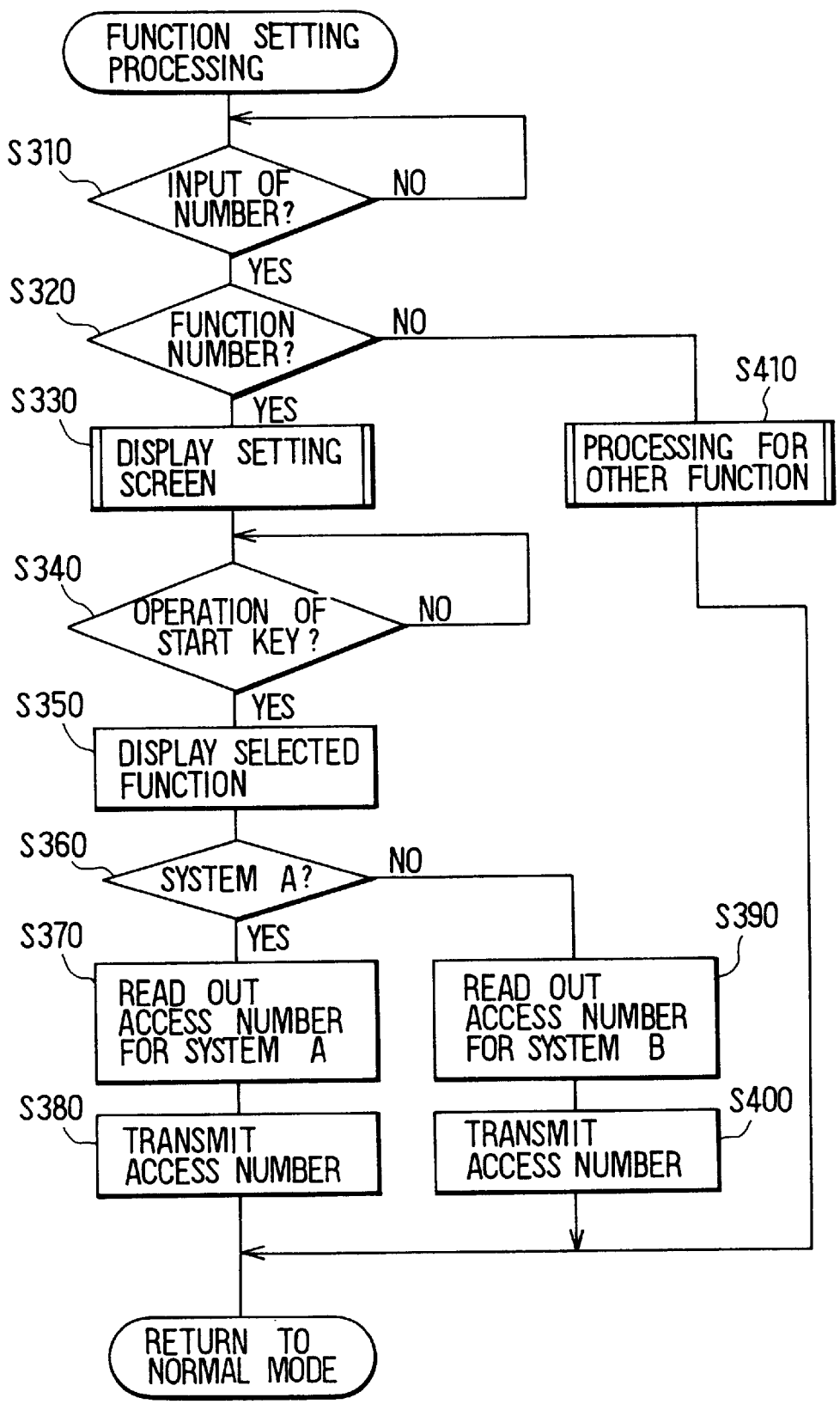
FIG. 6 is a flow diagram of processing carried out by the portable telephone apparatus to set, enable or disable a function.

As described by referring to FIGS. 6 and 7, with the portable telephone apparatus 1 implemented by the embodiment, a command to set, enable and disable the function to transfer an incoming telephone call or the unattended automatic answering function can be transmitted to the control center by a user operation common to the systems without the need for the user to be aware of differences among the systems, allowing the operations to be made very uniform and convenient.

It should be noted that, in the case of the above processing, the setting screens can be displayed cyclically. When a desired setting screen is displayed, the user operates the Start key 2a to transmit an access number stored in advance in the portable telephone apparatus 1 to the control center. As an alternative, the control unit 10 can also be designed to allow the user to enter an access number directly by operating the numeric keys 2c and, if necessary, the '*' key 2d and the '#' key 2e before pressing the Start key 2a in order to request the portable telephone apparatus 1 to carry out the same processing. In this case, the access numbers for system A or B are treated as reference numbers and other numbers are considered to be obtainable from conversion based on the table shown in FIG. 7.

For example, it is assumed that the access numbers for system A are treated as reference numbers. When it is desired to set the unattended automatic answering function, the user enters an access number of '△△21' and then operates the Start key 2a. If system A is adopted, the access number '△△21' is transmitted to the control center as it is. If system B is adopted, on the other hand, an access number '♦♦♦1' for system B corresponding to the access number '△△21' is read out from the table shown in FIG. 7 and transmitted to the control center. Operations for other functions can also be executed in the same way.

The technique of directly entering an access number is effective for a case in which access numbers are stored in advance in the portable telephone apparatus 1. If the processing shown in FIG. 6 is selected, first of all, the portable telephone apparatus 1 is put in a function setting mode and, then, an operation to display a desired screen for setting, enabling or disabling a function is carried out in the function setting mode. It is thus quite within the bounds of possibility that a number of operations need to be carried out and the time it takes to carry out the operations becomes longer accordingly. With the technique of directly entering an access number, on the other hand, typically, a 4 digit number is merely entered to accomplish the same processing in a simpler operation. In this embodiment, it is necessary to remember only 6 numbers for system A shown in the table of FIG. 7. In the case of 2 systems with access numbers different from each other, 12 numbers naturally need to be remembered. By virtue of the function to convert access numbers offered by the portable telephone apparatus 1, however, only half all the total number needs to be remembered, making the portable telephone apparatus 1 more desirable in that the operation convenience thereof is increased.

The above embodiment is exemplified by a portable telephone apparatus with a response hold function provided as a standard function for system A and not provided as a standard function for system B wherein, by processing other processing for a function serving as a substitute for the response hold function for system B. The similar processing may be implemented also for a telephone apparatus even in the case where none of the systems has such a function, as long as the similar functions can be attained by a substitute processing.

Access numbers used to set, enable and disable the function to transfer an incoming telephone call or the unattended automatic answering function are explained in the above embodiment. It should be noted, however, that access numbers used to set, enable and disable a function other than the function to transfer an incoming telephone call or the unattended automatic answering function can be used in the same way.

Even though the above embodiment implements only a wireless handset type cellular or PCS telephone, the present invention can be applied to a PHS (Personal Handy Phone System), a mobile telephone device for vehicles and stationary telephone equipment as well.

What is claimed is:

1. A telephone apparatus comprising:

a keypad for manually entering predetermined commands;

a control unit for carrying out predetermined processing which is individually tailored to one of a plurality of communication systems and varies in dependence on at least one of a control signal transmission system, a frequency in use, wireless service provider or, the type of service, in response to one of a plurality of predetermined commands;

wherein the predetermined commands entered via the keypad are each provided for one of a plurality of wireless communication systems that serves as a standard system; and, said control unit is programmed to execute, when one of said predetermined commands is entered via said keypad during operation under a nonstandard system for which processing for the standard system cannot be successfully executed, other predetermined processing of the nonstandard system in response to the entered command, said other predetermined processing substantially serving as a substitute for said predetermined processing that would otherwise have been executed under said standard system.

2. A telephone apparatus according to claim 1 wherein:

said control unit is programmed to transmit a response hold request to the control center of a wireless service provider for executing predetermined communication processing, when a response hold command is entered via the keypad upon arrival of an incoming telephone call from another telephone apparatus, so that a service provider's control center notifies said another telephone apparatus of a response hold state instead of establishing a state of communication with said another telephone apparatus upon receiving the response hold request; and the control unit is programmed to communicate with said another telephone apparatus when a response hold command is entered via the keypad upon arrival of the incoming telephone call from said another telephone apparatus during operation under the nonstandard system, and send command signals to notify the said another telephone apparatus of a response hold state.

3. A telephone apparatus according to claim 2, wherein a notification of the response hold state is executed by transmission of at least one of sound tones, music, or speech to to said another telephone apparatus to indicate the response hold state.

4. A telephone apparatus according to claim 2, further comprising:

at least one of random access memory, read only memory, or storage memory for storing a relation between predetermined feature access numbers for the standard system and other feature access numbers for the nonstandard system in advance, wherein the controller is programmed to call a service provider's control center by said predetermined access number so that the control center transfers the incoming telephone call to a predetermined telephone number or stores a message from the other telephone, when the incoming telephone call is made from the other telephone, and the control unit is programmed to, when operating under the nonstandard system, search an access number for the nonstandard system from an access number for the standard system entered by the keypad by using the previously stored relation, thereby transmitting the access number for the nonstandard system to the control center.

5. A telephone apparatus according to claim 4, wherein the predetermined access numbers are used for setting, enabling and disabling an incoming telephone call transferring function.

6. A telephone apparatus according to claim 4, wherein the predetermined access numbers are used for setting, enabling and disabling a unattended automatic answering function.

* * * * *